July 28, 1925.
A. W. LE BOEUF
1,547,504
MACHINE FOR MAKING METALLIC BRISTLE HOLDERS
Original Filed May 22, 1916    10 Sheets-Sheet 1
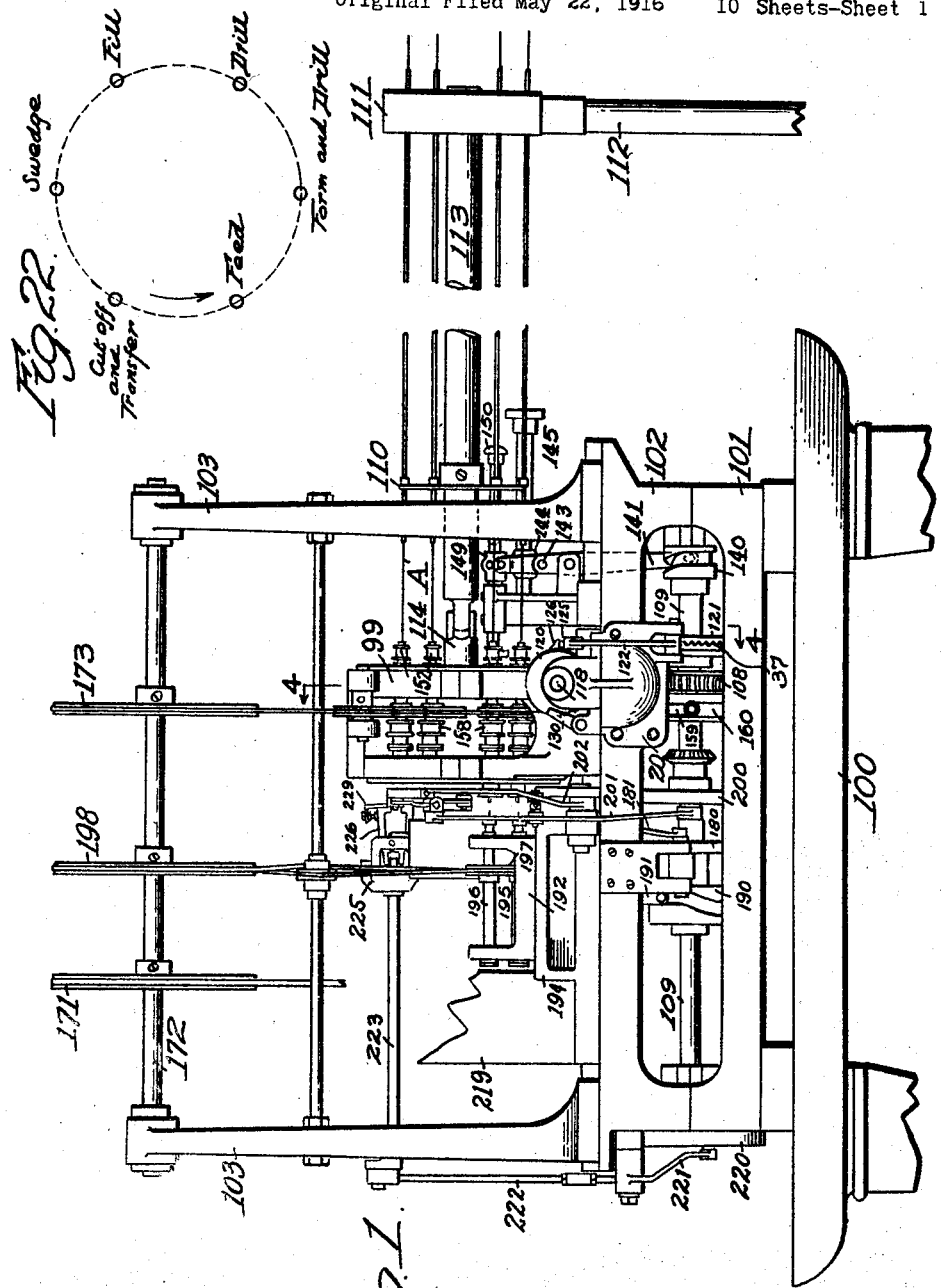

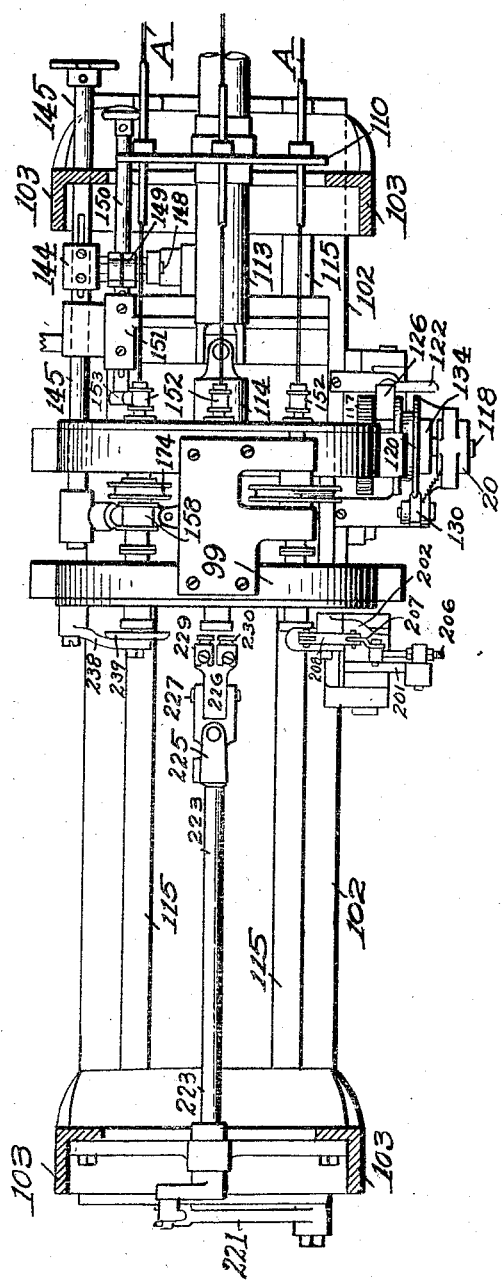

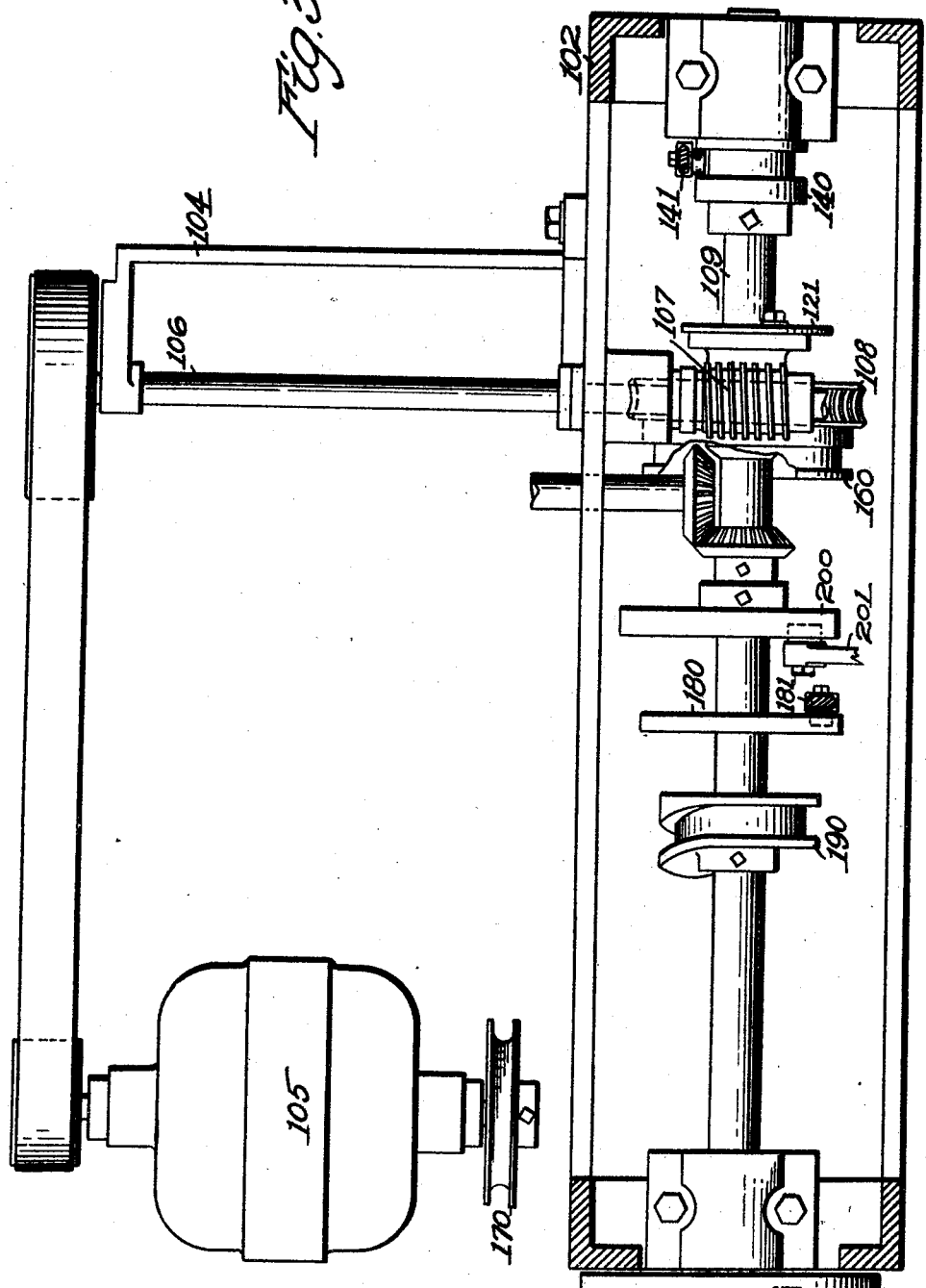

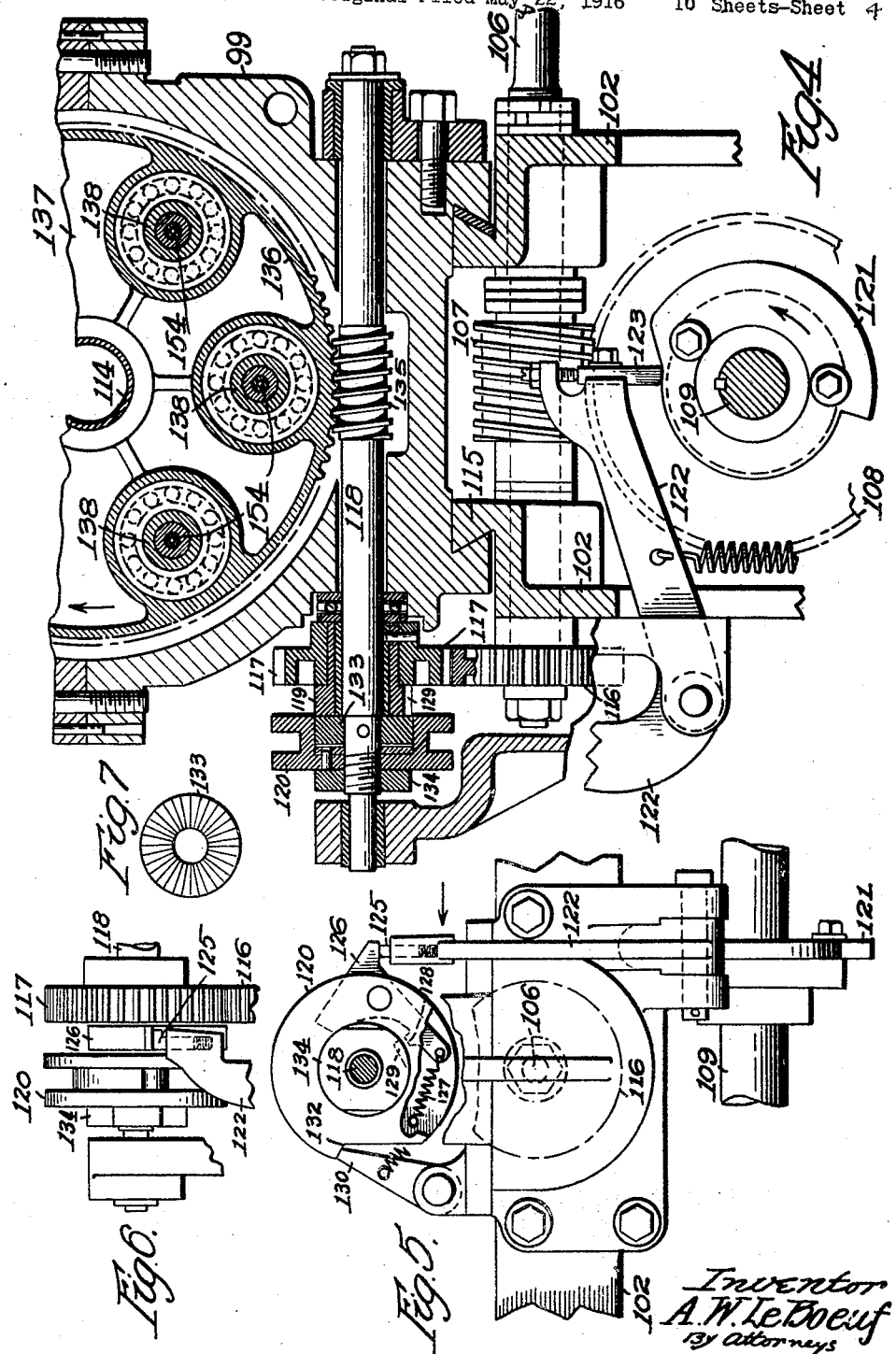

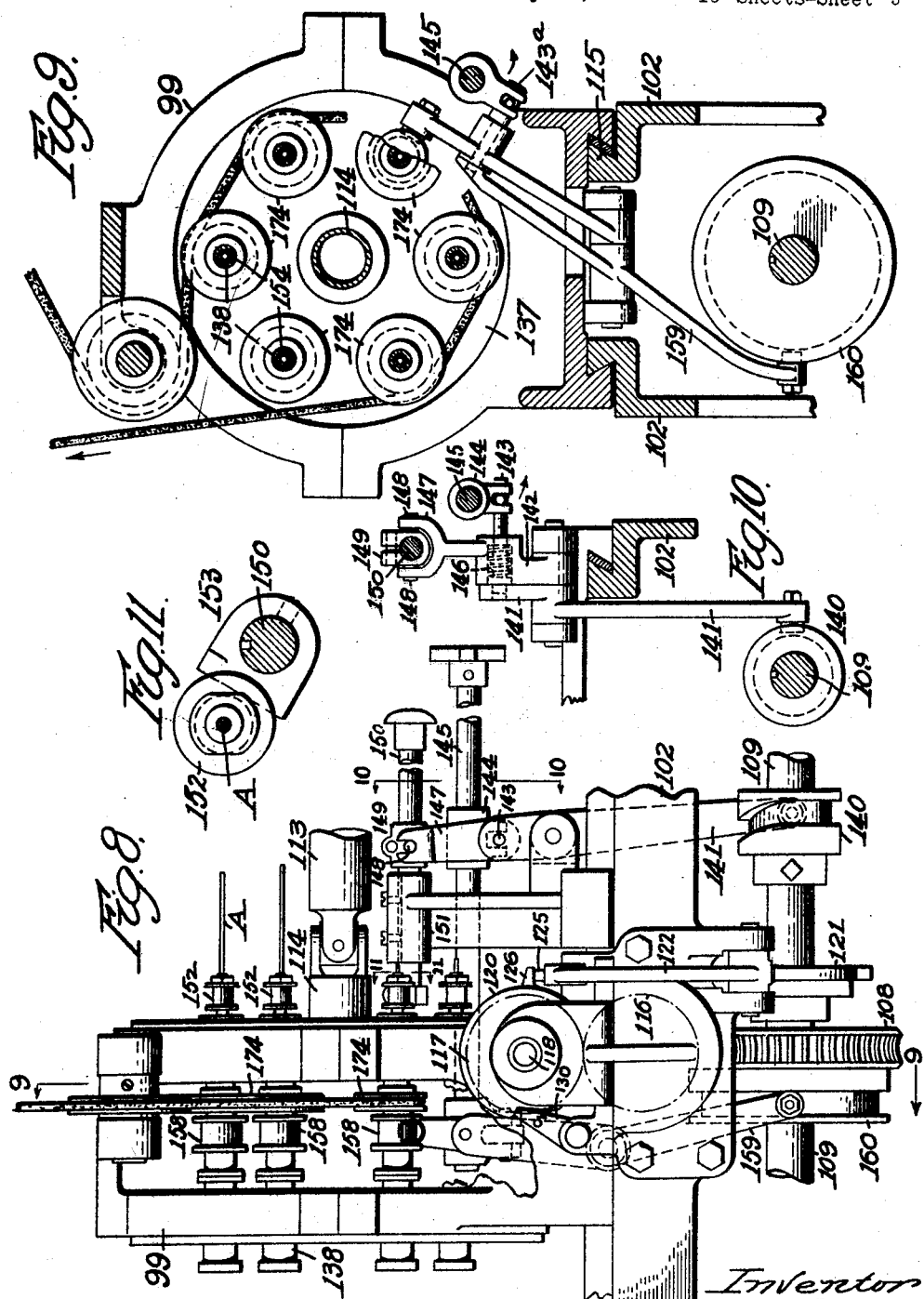

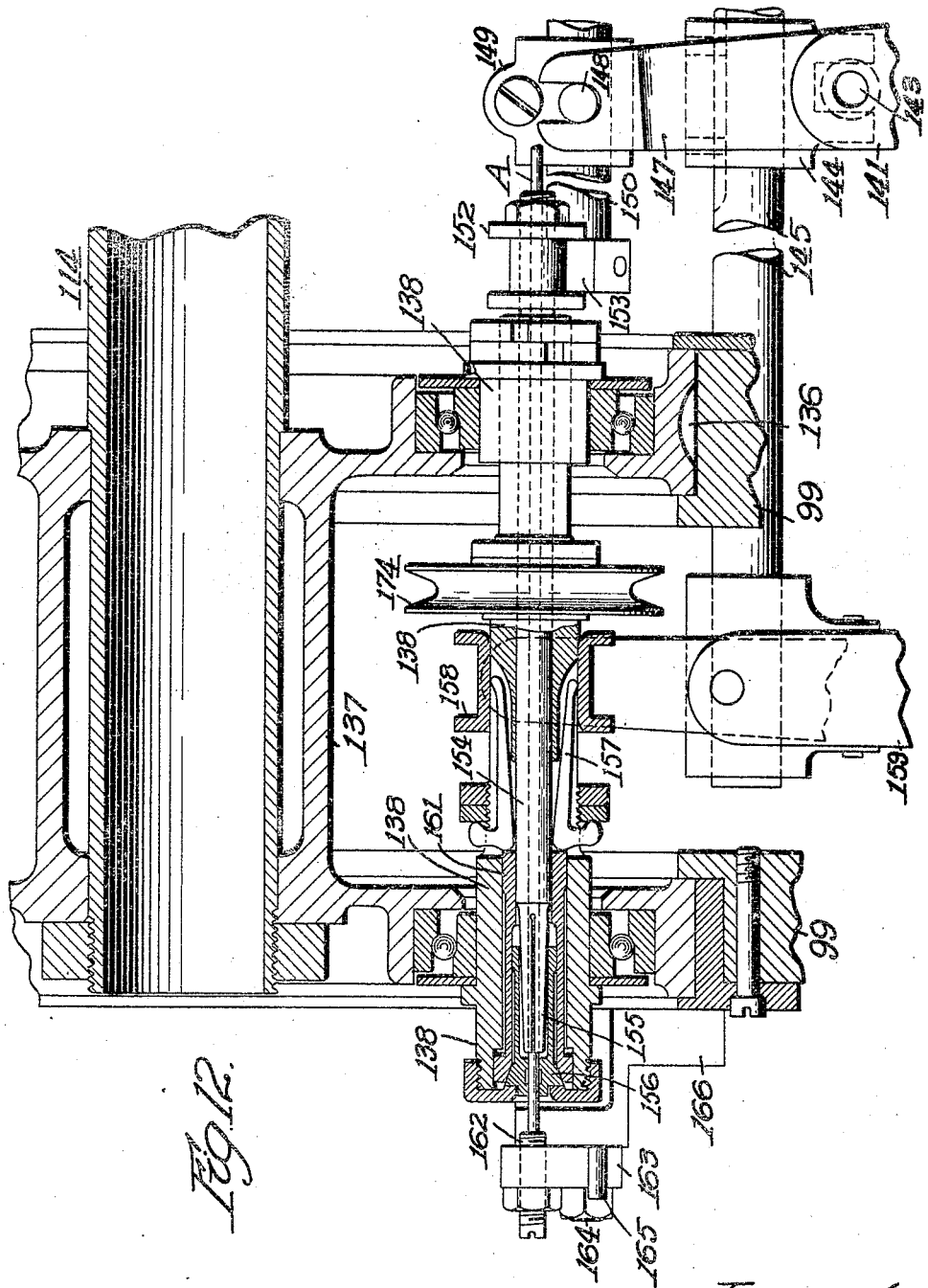

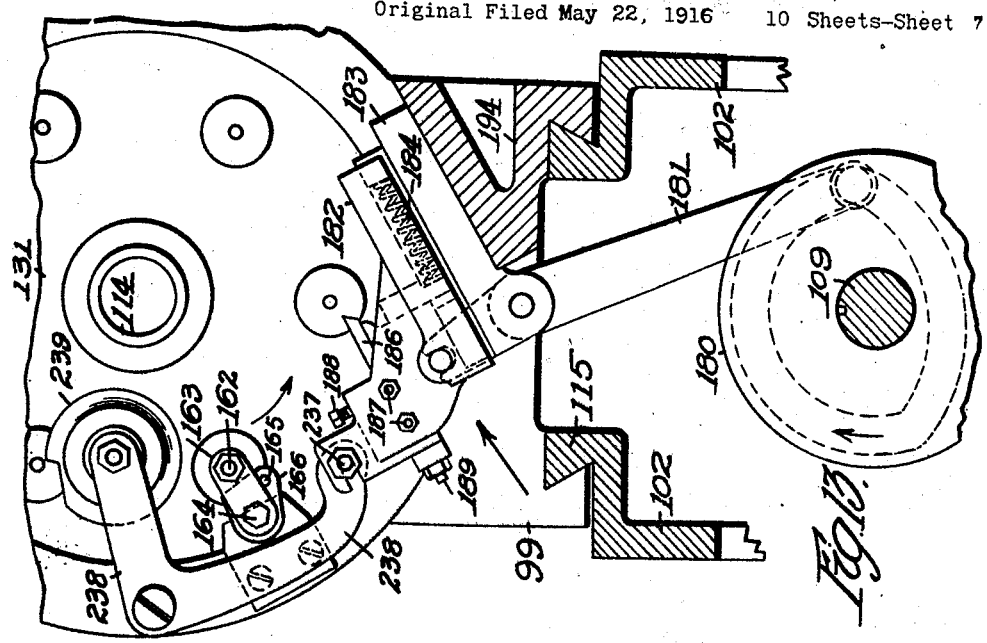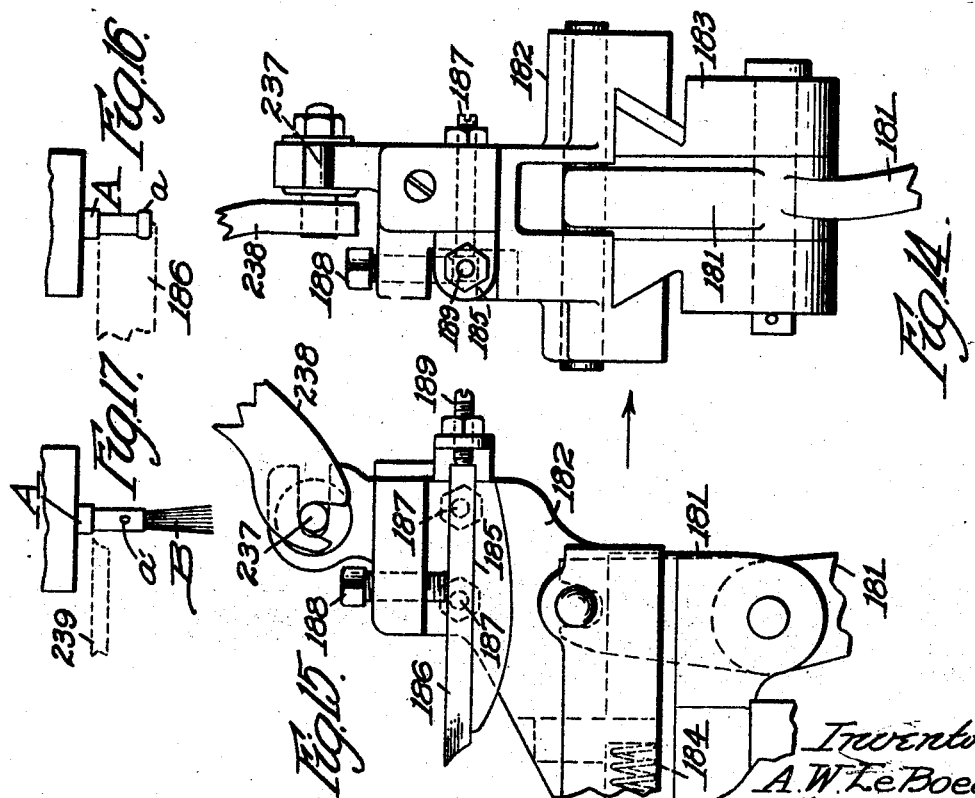

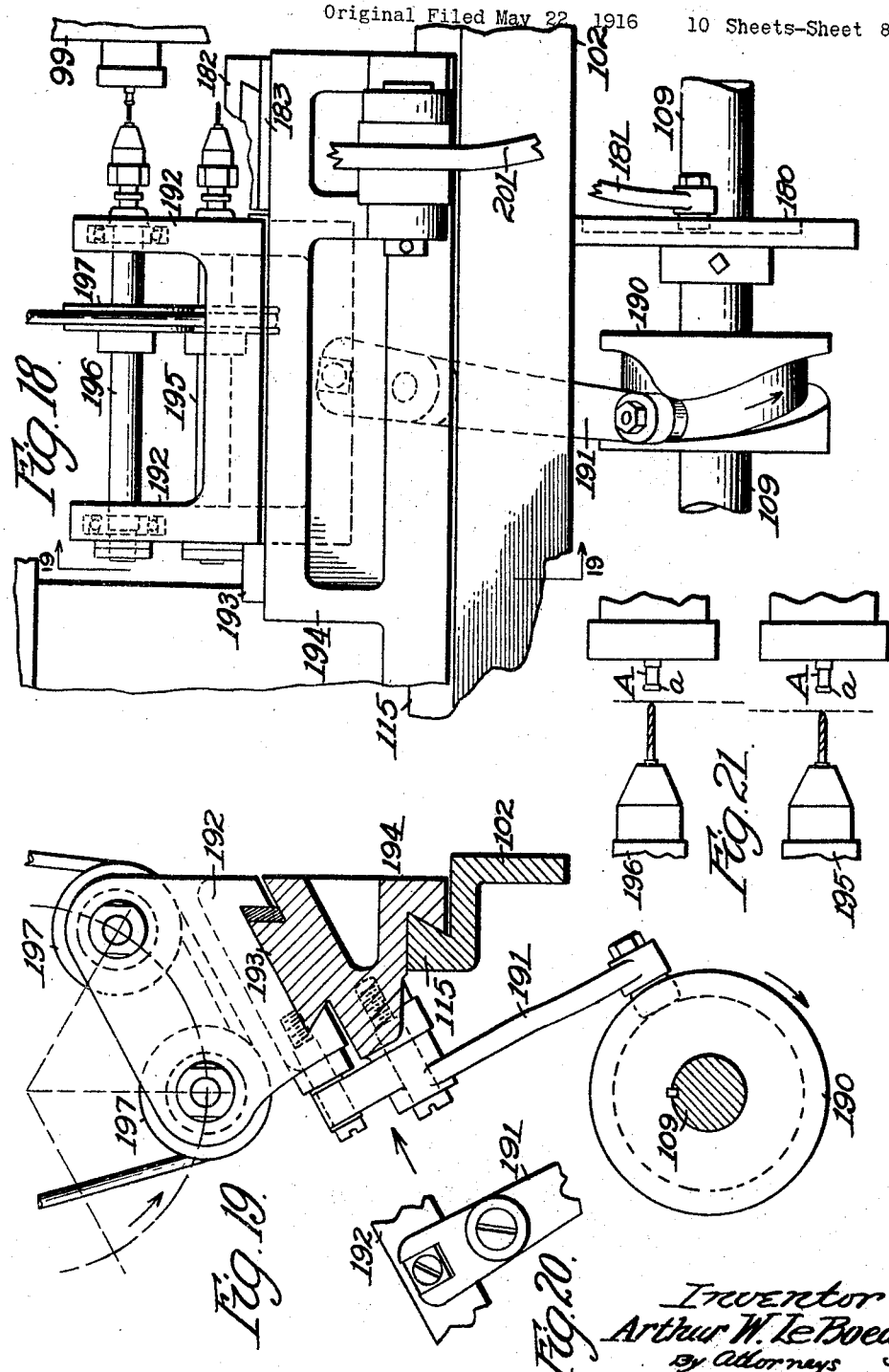

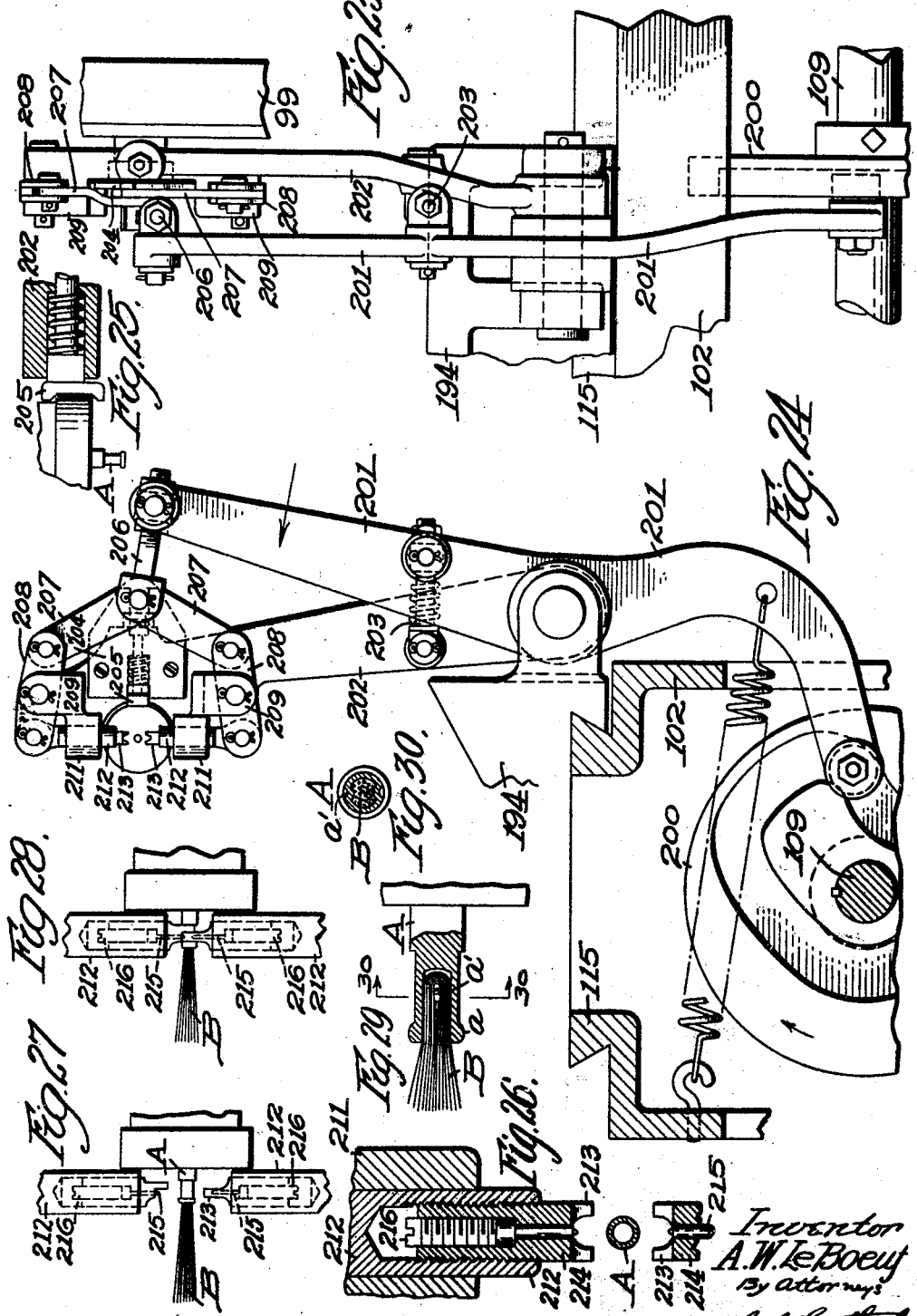

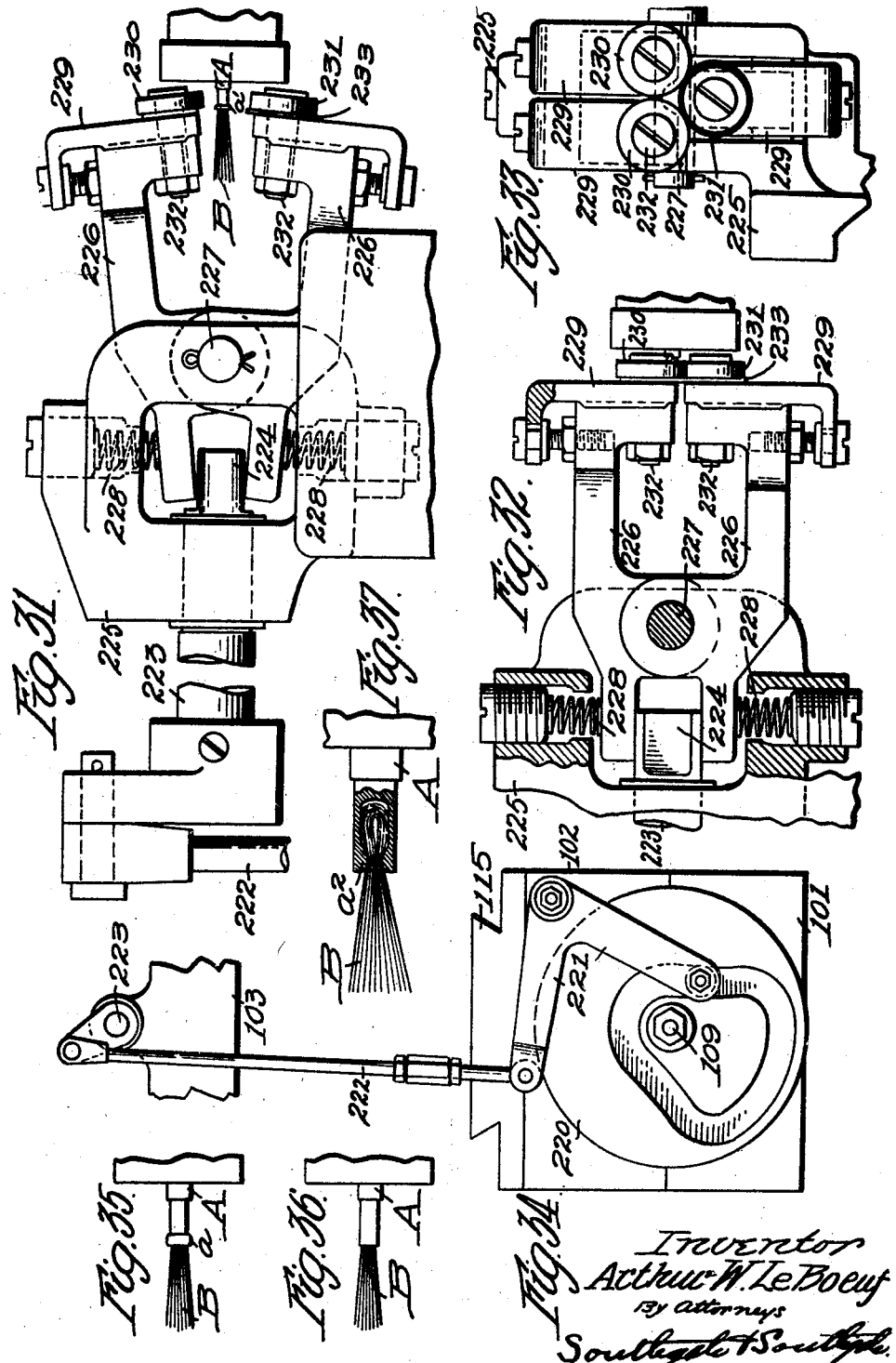

Patented July 28, 1925.

1,547,504

UNITED STATES PATENT OFFICE.

ARTHUR W. LE BOEUF, OF BRIDGEPORT, CONNECTICUT, ASSIGNOR, BY DIRECT AND MESNE ASSIGNMENTS, TO ALFRED THOMAS, OF WORCESTER, MASSACHUSETTS.

MACHINE FOR MAKING METALLIC BRISTLE HOLDERS.

Original application filed May 22, 1916, Serial No. 99,100. Divided and this application filed March 1, 1921. Serial No. 448,927.

*To all whom it may concern:*

Be it known that I, ARTHUR W. LE BOEUF, a citizen of the United States, residing at Bridgeport, in the county of Fairfield and State of Connecticut, have invented a new and useful Machine for Making Metallic Bristle Holders, of which the following is a specification.

This is a division of my original Patent No. 1,449,424 granted Mar. 27, 1923, on an application originally filed May 22, 1916, Serial No. 99,100.

This invention relates to an automatic machine for manufacturing metallic bristle holders for brushes.

The principal objects of the invention are to provide a machine of compact form so that the various parts thereof can be mounted on a small frame and take up very little space, which will be capable of manufacturing bristle holders automatically; to provide means whereby the said bristle holders in the shape of metallic cups are formed from one or more wires in an expeditious and convenient manner; to provide automatic mechanism for forming these cups comprising means for supplying the wire automatically, and means for drilling into the end of each of a plurality of wires in regular order, preferably by a plurality of drilling operations, means whereby when the tuft is placed in a cup thus formed, it is temporarily secured therein by an automatically clinching operation, and means whereby the cup is then automatically cut off the wire so as to come through the rest of the operations as a unit separate from the wire; and also, more specifically, to provide a rotary turret capable of operating on a plurality of wires provided with means for rotating the wires carried thereby on their own axes at certain times during the operation of the said turret, so that the wire itself shall be projected through the turret into a certain position and rotated on its own axis while a forming tool shapes it to a convex form at the end, then indexed around and rotated while an oppositely rotating drill is forced into its end axially, then fed around while still rotating, and its rotation continued during a second drilling operation, then fed around another step and its rotation on its own axis arrested while the tuft of bristles is applied to it, and clinched in its end, the intermittent rotation of the turret being then continued and the rotation of the wire on its own axis being then resumed while the convex end of the wire is forced inwardly to permanently secure the tuft therein, and the portion of the wire constituting the cup with a tuft of bristles therein is cut off; and to provide improvements in means for operating and co-ordinating the various parts of the mechanism as above described and in the various details and combinations thereof. Further objects and advantages of the invention will appear hereinafter.

Reference is to be had to the accompanying drawings, in which—

Fig. 1 is a front view of part of a tooth brush making machine embodying this invention;

Fig. 2 is a plan of the same;

Fig. 3 is a plan of the driving mechanism slightly enlarged showing some elements in section;

Fig. 4 is a sectional view on the line 4—4 of Fig. 1 on enlarged scale showing the wire turret indexing mechanism;

Fig. 5 is a front elevation of a portion of the same;

Fig. 6 is a side view of the upper portion of the same;

Fig. 7 is an elevation of the index clutch;

Fig. 8 is a front elevation of the turret mechanism;

Fig. 9 is a sectional view on the line 9—9 of Fig. 8;

Figs. 10 and 11 are sectional views respectively on the lines 10—10 and 11—11 of Fig. 8;

Fig. 12 is a central sectional view of the turret spindle on enlarged scale;

Fig. 13 is a face view of the turret showing the forming and cutting off mechanism;

Fig. 14 is a rear elevation of the same looking in the direction of the arrow in Fig. 13;

Fig. 15 is an end view of the same looking in the direction of the arrow in Fig. 14;

Fig. 16 is a diagrammatic view showing the operation of the forming tool;

Fig. 17 is a similar view showing the operation of the cutting off tool;

Fig. 18 is a front elevation of the drilling mechanism;

Fig. 19 is a sectional view of the same on the line 19—19 of Fig. 18;

Fig. 20 is a slanting elevation of a portion of the same;

Fig. 21 is an enlarged view similar to a part of Fig. 18 showing the two drilling operations;

Fig. 22 is a diagrammatic view showing the sequence of operations of the wire turret indexing mechanism;

Fig. 23 is a front view of the nicking mechanism;

Fig. 24 is an end view of the same;

Fig. 25 is a detail view of the bumper for limiting the nicking mechanism;

Fig. 26 is a sectional view on enlarged scale of the nicking mechanism through the center of the nicking head;

Figs. 27 and 28 are two full sized views of the nicking mechanism showing it in two positions;

Fig. 29 is an enlarged sectional view of one of the metal cups showing the tuft of bristles in position and the nick formed therein;

Fig. 30 is a sectional view of the same on the line 30—30 of Fig. 29;

Fig. 31 is a full sized front elevation of the swedging mechanism in open position;

Fig. 32 is a similar view showing it in closed position;

Fig. 33 is an end elevation of the same;

Fig. 34 is an end elevation of the operating mechanism therefor;

Fig. 35 is an enlarged front elevation of one of the bristle cups just before the swedging operation;

Fig. 36 is a similar view after its operation is completed; and

Fig. 37 is a sectional view on further enlarged scale showing the bristle cup after the swedging operation is completed.

The invention is illustrated in the form of a machine for making tooth brushes in which a base 100 is provided for supporting a main frame of the machine which is shown as consisting of several parts 101, 102, 103, and 104. The motive power for the machine is preferably obtained from a motor 105 which drives a shaft 106. This shaft by means of a worm 107 and worm wheel 108 drives what I call the main shaft 109 running longitudinally of the machine.

As has been stated the tufts are formed by forcing bunches of bristles into metallic cups, and these cups are made on this machine. For this purpose wires A, preferably of aluminum, are supported on supporting reels 110, the end one of which is rotatably carried by a frame 111 supported in any desired way, as for example, by a post 112 extending up from the floor. The details of this reel will not be described as they do not constitute a part of this invention.

*Indexing turret for the wires.*

These reels are located about a central shaft 113 and are adapted to support several wires while they are fed through a series of heads on a turret which is mounted on a hollow shaft 114 to which the shaft 113 is pivotally connected. This shaft is mounted on a turret frame 99 mounted on ways 115 on the frame member 102. The shaft 106 is provided with a gear 116 fixed thereon which meshes with a gear wheel 117 loose on a shaft 118 parallel with the shaft 106. Rotatable with this loose gear 117 is a hub 119. In the form shown the shaft 106, and also the gear 117, makes eighteen revolutions to one of the shaft 109. On this shaft 109 is an indexing cam 121 which operates an indexing lever 122 provided with an adjustable and removable shoe 123 for engaging the cam and receiving its motion from it. This lever is provided at its other end with a second removable and adjustable shoe 125 which stops a pawl 126 that is pivoted on the clutch member 120. A spring 127 normally holds this pawl back in a position in which a tooth 128 thereon engages in a notch 129 on the hub 119. This is the position of the pawl while this member rotates. When it rotates around to the point shown in Fig. 5 the end of the pawl engages the shoe 126 and it is caused to swing into the position shown in Fig. 5. At the same time a latch 130 pivoted on the frame engages behind a tooth 132 on the clutch disc 120 and positively prevents it from rotating backwards. The lever 122 and latch 130 are pivoted on a bracket 20 fixed on the frame member 102.

The rotation of the clutch disc 120 causes the rotation of the shaft 118 through the other clutch section 133 which is fixed on this shaft. 134 indicates an adjusting nut for disconnecting the clutch sections.

The operation is very simple. The gears 116 and 117 together with the hub 119 are rotating constantly, but inasmuch as the shoe 125 holds the pawl 126 in the position shown in Fig. 5 this rotation of the hub 119 is idle while the shoe 123 is on the low part of the cam 121. When it passes off this part to the high part of the cam the shoe 125 is drawn out from under the pawl 126 to the left in Fig. 6 and the spring 127 draws that pawl in so that on the next revolution of the hub 119 the notch 129 will engage the tooth 128 and cause the disk 120 on which the pawl 126 is pivoted to rotate with it. It will rotate as many times as the cam 121 provides for. In the present instance this cam is so designed as to give it nine complete rotations. Before the ninth rotation is completed the shoe 123 drops off the high part of the cam and the spring 127 brings the shoe 125 over into the position shown in Figs. 5 and 6 so that just as that revolution is completed the tooth 128 will be drawn out of the notch 129 and the hub 119 will continue to rotate idly. By this arrangement it will be seen that the shaft 118 will necessarily make exactly one or more complete revolutions. A spring 37 holds the shoe 123 down against the cam 121.

This rotation of the shaft 118 operates through a worm 135 to drive a wheel 136 on the exterior of the wire turret 137 which is fixed on the shaft 114. It will be understood of course that this turret is provided with a plurality of ball-bearing heads 138 each pair designed to hold the wire while some operation is being performed upon it. Figs. 8 to 12.

*Wire feed.*

The first operation, of course is to draw the wire into the head and that is performed in the following way. On the shaft 109 is a feeding cam 140. This operates a lever 141 which may be all in one piece, but is shown as having behind its short arm an arm 142 pivoted on the pivot stud on which the lever swings. Into this arm 142 extends a pin 143 adapted to be operated by the oscillation of a collar 144 fixed on a rod 145, having a head on it for manual manipulation. This pin is normally pressed in by a spring 146 so that its end enters a socket in the short arm of the lever 141 and under normal conditions this lever operates like any other lever. The arm 142 necessarily works with the lever under these conditions, but in setting the machine up, if it is desired to disengage the lever 141 from the parts which it operates, the rod 145 is oscillated to pull out the pin 143 and then the arm 142 and lever 141 can be operated independently and the former moved for adjustment or for hand feeding. This arm 142 is provided with a yoke 147 which receives trunnions 148 on a collar 149 mounted on a feed lever rod 150. This rod is adapted to reciprocate in its bearing 151, and is reciprocated by the operation of the cam 140.

Connected with each one of the turret heads 138 and projecting from the end of the turret is a double collar 152. These collars are of course rotatable with the turrets and the feed lever rod 150 is provided with a radially projecting operating end 153 which can be moved by the reciprocation and oscillation of this rod into a position to come between them as they come around into the proper position. (Fig. 11.) The turret stops in such position each time that one of these double flanged collars is in engagement with the feed lever rod end 153 and consequently is under the control of the same. It is at this time that the cam 140 operates this rod. The operation is a mere reciprocation and through the instrumentality of a chuck a wire A which extends through the head is operated. Assuming the parts to be in the position shown in Fig. 12 the collar 152 is drawn back to the right. This draws with it a hollow shaft 154 on which the collar is mounted which draws back a well-known form of split friction clutch jaws 155. These slide along the wire which is now held positively in its original position by means of positive clutch jaws 156. These are operated by clutch levers 157 under the control of a collar 158 which in turn is operated by a lever 159 from a clutch cam 160. The conical surfaces between the jaws 156 and an intermediate sliding member 161 (operated by the levers 157) are responsible for this action. The jaws 155, having been drawn back to the extreme end of the stroke, start forward immediately after the collar 158 is moved to the left far enough to release the ends of the clutch levers 157, and therefore the friction jaws 155 move the wire forward to the left in this figure. It will be understood that in the position in which this operation has been assumed to start the wire between the end of the clutch and the screw stop 162 has been removed by means to be described hereinafter. Therefore the forward movement of the jaws 155 pushes the end of the wire up against this stop and they have sufficient movement to make sure of accomplishing this result, but as they grip the wires frictionally only they may have an excess of that movement. As they stop moving forward the collar 158 moves again to the right and the wire is clutched positively in position by the jaws 156. I do not claim herein the details of this clutch as it does not constitute a part of this invention and any equivalent can be used.

It is to be noted that the lever 159 is shown in Fig. 9 as provided with mechanism like that of the lever 141 for the same purpose. When the rod 145 is turned to withdraw the pin 143 it also withdraws a similar pin 143ª and frees the collar 158.

The stop pin 162 is mounted on an arm 163 which is adapted to swing on the center of a bolt 164. (Fig. 13). It is normally held down by gravity against a pin 165 mounted on a stationary member 166. Therefore if it is desired to take short ends of wire out of the jaws it is convenient to swing this stop up out of the way so that the wire can be pulled or pushed through.

All the wires carried by the reels 110 rotate intermittently with the turret. The feeding position of the turret is indicated in Fig. 22 and the operations to be performed in the other positions which the turret occupies are also indicated in that figure.

On the motor 105 is another pulley 170. This drives a belt which through a pulley 171 drives a shaft 172 carried by the part 103 of the frame. On this shaft is another pulley 173 which is provided with a belt that contacts with several pulleys 174 each one fixed to one of the hollow heads 128 each of which rotates a wire A held thereby. It is to be noted that the belt which operates these pulleys 174 extends around them in such a way as to engage them in all their positions except one, (see Fig. 9). The reason for this will appear later, but it will be obvious that in all other positions these pulleys, and consequently the wires which they control, are rotated constantly on their own axes independently of the indexing of the turret.

Cup forming.

As the turret rotates away from the feed position as indicated in Fig. 22 the wire moves downwardly to the position indicated in that figure as "Form and drill". This is the lowest position and in that position the mechanism is designed in the present case to perform a shaping operation on the projecting end of the wire and to drill axially into it. This shaping mechanism is actuated by a cam 180 on the shaft 109. (Fig. 13.) This cam by means of a lever 181 reciprocates a tool holder slide 182 movable in ways on a stationary member 183 on the turret frame 99. A spring 184 moves and normally holds the tool holder slide back from the work and the cam positively moves it upwardly to the right in Fig. 13. This slide is provided with a rest in the form of a surface 185 for a cutting tool 186. Extending in through the body of the slide are shown two screws 187 which are adapted to be adjusted to form surfaces for the tool to engage on that side. A binding screw 188 is shown for holding the tool down on the surface 185 and an adjusting screw 189 for controlling its adjustment longitudinally. The reciprocation of this tool toward and from the work as indicated in Fig. 13 is accomplished in this manner and the tool is designed to cut the blank A into the form shown in Fig. 16 so as to reduce its neck and produce a convex circumferential projection $a$ at its end. The wire A rotates on its axis.

Drilling.

While this operation is being performed the first drilling operation also takes place. On the shaft 109 is a drill cam 190 operating a lever 191 which moves a slide 192 on ways 193 on an adjustable table 194 located in ways on the frame 102. This slide is a drill head carrying two drill spindles 195 and 196 as shown in Figs. 18 to 21. Each of these spindles is provided with a pulley 197 and these pulleys are constantly operated from the shaft 172 by a belt passing over them and over a pulley 198 on this shaft. The drilling operation is shown more especially in Fig. 21 and in that case the drill carried by the first drill spindle 195 performs the operation above mentioned, drilling into the end of the blank while it is being operated upon by the tool 186. It will be seen that the drill and the blank on which it operates are both being rotated, of course in opposite directions. Inasmuch as the wire being operated upon is aluminum it is desired to get the speed of drilling up to a high point, approximately 4000 revolutions per minute. By rotating both the drill and the work this can be accomplished at what may be considered ordinary speeds.

The drill on the spindle 195 having performed its preliminary drilling operation the drill slide is withdrawn as the tool holder slide 182 is withdrawn and the turret is then indexed around one more position. In the second position the blank which has previously been mentioned is brought to the position indicated by the word "Drill" in Fig. 22, and the operations repeated. In this case the second blank is formed and drilled while the first blank receives its finish drilling operation from the drill carried by the spindle 196. This drill is a little bit longer and slightly larger than the first drill so that it performs a finishing operation.

Tuft filling.

It will be understood, of course, that the successive blanks are operated upon in this way. I will therefore trace only the first blank. The next position of the turret brings the blank into the position marked "Fill" in Fig. 22. In this position the head of the turret which supports the blank is freed from the belt as indicated in Fig. 9 and does not rotate. The tuft of bristles B is introduced longitudinally into the end of the blank while held in this position by means that is described in my above mentioned original patent. It is sufficient to say that it is pushed in positively and the pushing means drawn out so as to leave the doubled over part of the bristles extending to the bottom of the hole drilled in the blank and projecting from the mouth thereof.

Nicking.

On the shaft 109 is a nicking cam 200. This operates a lever 201 shown in Fig. 24. This lever is pivoted on the table 194 and is provided with two arms, one of which is integral with the lower part of the lever as indicated in Fig. 24, and the other arm 202 is pivoted on the same pivot. These arms are connected by a spring pin 203 which forces them yieldingly apart as far as possible. The arm 202 is provided on its end with a guide plate 204 and with a bumper 205 or other means for limiting its motion inwardly. In the present case this bumper is shown as spring-pressed and as engaging against the circumference of the temporarily stationary head 138 which is located in position to be operated upon by these elements. This then limits the motion of this arm 202 inwardly and holds it in constant position.

The arm 201 is provided with an adjustable rod 206 pivotally connected with the arm. At the end of this rod are pivoted two links 207, each one also pivoted to a lever 208. These levers are pivoted on projections 209 carried by the arm 202. Carried by these projections are guides 211 for reciprocating slides 212 which are pivoted to the levers 208. These slides carry nicking jaws 213. Each of these jaws is mounted on a pin holder 214 screw-threaded into the guide 212 and each one carries within it a nicking pin 215 headed inside and held in position in the nicking pin holder 214 by a screw 216. When these jaws come together the nicking pins are forced into the soft metal of the wire A to form two nicks $a'$. These are arranged to be located opposite each other and to extend axially transverse to the plane of the tuft of bristles so that they will extend into the concave side of the bent over center thereof. The operation of these nicking jaws is shown in Figs. 27 and 28 especially and the results in Figs. 29 and 30, the former two figures showing two different positions of the jaws, the positions in Figs. 24 and 27 being the same.

*Swedging mechanism.*

It will be noted that after the turret indexes, when the nicking operation is completed, the head which has held the blank subjected to that operation will again come into rotation by its pulley engaging the belt. On the shaft 109 is a swedging cam 220 located in the present instance at the end of the shaft beyond the frame (Figs. 3 and 34). This operates, by a lever 221, an adjustable rod 222 and oscillates a shaft 223. This shaft is provided with a slabbed off end 224 which projects into a frame 225 carried by a bristle hopper frame 219 and engages the ends of two swedge roll carrier levers 226 pivoted on a stud 227 carried by the same frame. Springs 223 force these ends of the levers against the end of the shaft 223 and it will be obvious that by the oscillation of this shaft the levers will be moved alternately to the positions shown in Figs. 31 and 32.

While in the position shown in the former figure, the nicked cup with its tuft of bristles B therein comes up into position between the ends of the levers 226. In the present case one of these levers is shown as provided with two adjustable holders 229 each carrying a swedging roll 230. The other lever, that is, the one below, carries a single roll 231 in the same way. These rolls are mounted to rotate freely on bolts 232. When the shaft 223 turns to bring the parts into the position shown in Figs. 32 and 33 the rotating blank A engages between the freely rotatable swedging rolls. They then operate upon it to reduce it from the form shown in Fig. 35 to that shown in Fig. 36. The lower one of these rolls 231 is shown as having a flange 233 thereon so as to give a finished product. This operation has the effect of turning the convex circumferential projection $a$ inwardly so as to form an inwardly projecting collar $a^2$ in intimate contact with the bristles of the tuft so that the same will be held permanently in the cup in addition to the holding action of the nicks $a'$. This also provides a circular passage and consequently a circular tuft. This is shown in Fig. 37. It will be noticed also that this metallic cup which forms the base of the bristle tuft is shown here as of uniform exterior diameter throughout its length and reduced from the full diameter of the aluminum wire blank.

*Cutting off.*

The next indexing of the turret brings this blank around to the position marked "Cut off and transfer" in Fig. 22. Referring now to Fig. 13 it will be seen that the tool holder slide 182 is connected by a slot and bolt construction at 237 with a lever 238 pivoted on the stationary frame 99 in which the turret operates, and this is provided with a non-rotary cutter 239 having a sharp cutting edge and adapted to move in toward the rotating blank and cut it off as indicated in Fig. 17. It will be noted that the cutter itself is shown as provided with a concave edge which acts to round off the end of the blank as it is cut off and removed. The tuft is then received by the transferring mechanism which will not be described herein, as it is shown in my above mentioned original patent.

*Operation.*

The operation of the machine is as follows: A plurality of wires A, as stated, are located on the wire-carrying reel which is capable of rotating in its supports with the cup-forming turret. This turret is rotated intermittently, a step at a time, and one wire having been pushed forward through the first chuck or head is stopped in a definite position and then clamped by the clutch. The turret then rotates one sixth of a revolution and stops. The first drill is brought up to it so as to drill out a hole axially into the end of the wire.

The means whereby the exterior of the cup is made convex at the extreme end thereof operates on the wire while it is being preliminarily drilled. Then the head rotates one step and stops when the second drill is brought up into position and further drills out the opening. This second drill is a little larger and longer than the first one so that it finishes the opening and brings it to depth. It will be understood that the two drills always act simultaneously one on a new wire and the other on a wire which has been through the first step of the operation. The two drilling operations having been completed the head rotates a third step and the first mentioned blank is then brought up into position to receive a tuft of bristles which is supplied to it in a way which is described in said patent. It will be understood that the head is stopped here while the tuft is inserted in the cup and that the nicking or clinching jaws are operated to force the metal of the cup inwardly at two opposite sides to clinch the tuft in position. The belt which rotates the several heads with which the turret is provided is so arranged that it engages the pulleys of the several heads in all positions thereof except in this position and here it is free from the pulley and consequently the head does not rotate while the tuft is being applied to it nor during the nicking or clinching operation. After that is finished the turret rotates another step bringing this pulley into contact with the belt again and the turret comes to a stop in the next position where the convex edge of the cup is forced inward to permanently clinch the cup with its tuft of bristles. The turret, of course, stops while the cup is cut off and discharged from this part of the machine, but the head rotates on its own axis. A needle forces the tuft of bristles straight out into the metallic cup, which is at that time in alignment with the needle, and leaves them in this cup. It is as this needle is withdrawn that the clinching or nicking operation takes place to force opposite metallic projections into the tuft and permanently secure the bristles in the cup.

The last operation before the cup is cut off from the wire is to force inwardly the convex enlargement at the end of the cup to finish the cup and tuft and still leave the cup of uniform diameter outside. In other words, the projection which formerly was outside is now located on the inside and the outside left in a true finished form. This projection on the inside grips the bristles and permanently holds them in position, the nicking operation being mainly for temporarily holding the tuft in the cup.

When the completed tuft in its cup is just ready to be finally separated from the wire held by the head, a transferring device swings up into position to engage the bristles and prevent the tuft falling away and at the same time hold it on the transferring device. The details of the operation of this transferrer will not be repeated here, but it is sufficient to say that the transferrer having grasped the tuft beyond its metallic cap swings over through a considerable arc into a substantially horizontal position from which the tuft is applied to the brush handle or blank under pressure and left secured therein by friction.

It will be seen therefore that this machine is entirely automatic, forming the wire into holding cups for the tufts, drilling the blanks and forcing the tufts into the holes thus formed so as to produce the complete tuft which needs only to have the bristles trimmed down to the proper length after it leaves the machine. All the parts are conveyed from one position to another in the machine automatically and there is no need for any expert oversight of the operations. Practically all that the operator has to do is to see that the machine is running, and to see that it is properly supplied with the raw products which it uses. No claim is made herein to the process disclosed. The right is reserved to present the claims thereon in a divisional application.

Although I have illustrated and described only a single embodiment of the invention and shown it as applied to a definite character of brush tuft I am aware of the fact that many modifications can be made in the details of construction and combinations of parts of the mechanism and that it can be applied to the manufacture of other types of metallic holders without departing from the scope of the invention as expressed in the claims. Therefore, I do not wish to be limited in these respects, but what I do claim is:—

1. In a metal working machine, the combination of an indexing turret, means for rotating said turret intermittently, said turret being provided with a plurality of heads thereon, each having jaws for gripping a wire, said heads being rotatable on their own axes, a wire feeding device comprising a feed lever, a cam for operating said lever, a feed lever rod connected with said lever to be operated thereby, each of said heads being provided with means whereby once during each rotation of the turret the head is controlled by the feed lever rod, said feed lever having one arm thereof provided independently of the other arm, a spring-pressed pin supported by said arm and adapted to be moved into the other arm to connect the two arms and cause them to move together, and means for operating said pin by hand.

2. In a metal working machine, the combination of a head having jaws for gripping a wire, said head being rotatable on own axis, a wire feeding device comprising a feed lever, a cam for operating said lever, a feed lever rod connected with said lever to be operated thereby, said head being provided with means whereby the head is controlled by the feed lever rod, said feed lever having one arm thereof provided independently of the other arm, a spring-pressed pin supported by said arm and adapted to be moved into the other arm to connect the two arms and cause them to move together, and means for operating said pin by hand.

3. The combination of a head having a chuck for holding a wire centrally therein, means for feeding a wire through, means for stopping the wire and limiting its position when the feeding operation is complete so that the wire will project beyond the end of the head, means for drilling a hole into the end of the wire for a tuft of bristles, means for then nicking the wire to force projections inwardly for the purpose of holding a tuft of bristles therein, means whereby the shaped end of the wire is swedged to force it inwardly around the bristles and permanently hold them in position, means for cutting off the end of the wire with its enclosed bristles and shaping the end of the cut off cup.

4. In a brush making machine, the combination of a turret, means for intermittently rotating the turret, a plurality of heads on the turret, each having a chuck for holding a wire centrally therein, means for feeding a wire through each chuck when in one position, means for stopping the wire and limiting its position when the feeding operation is complete so that the wire will project beyond the end of the head and the end of the turret, means for shaping the end of the wire at the next position of the head, means for drilling a hole centrally into the end of the wire, means for completing the hole at the next position of the head for a tuft of bristles, means for then nicking the wire to force projections inwardly for the purpose of holding the tuft of bristles therein, means whereby at the next position the shaped end of the wire is swedged to force it inwardly around the bristles and permanently hold them in position, means for cutting off the end of the wire with its enclosed bristles at the next station and shaping the end of the cut off cup, and means for rotating the heads during the drilling, cutting off, and shaping operations.

5. In a metal working machine, the combination of a plurality of heads rotatable on their own axes, and each adapted to hold a wire centrally therein, a tool holder mounted on the machine, a forming tool carried by said tool holder for engaging the rotating wire carried by one of the heads and shaping it, a pivoted frame, a cutting tool mounted on said frame, and means whereby the motion of said forming tool into operative position will also move the cutting tool into a position to cut off the end of the wire held by another head.

6. In a metal working machine, the combination of a turret having a plurality of heads thereon, means for forming a wire held by one of the heads, means for simultaneously cutting off a wire held by another head, said two means comprising a slide, a forming tool holder carried by said slide, a lever carrying said cutting means, and a connection between the lever and the slide whereby the movement of the slide to operative position also swings the lever to operative position.

7. In a metal working machine, the combination of means for holding a metallic wire, means for forming up the end of the wire to provide a projecting integral ring around the outer edge thereof, means for drilling centrally into the end of the wire to form a cup for receiving the bristles, means for shaping the cup to cause it to grip the bristles, and means for thereafter forcing the projecting ring inwardly to bring the exterior surface to a true cylindrical shape and form an inward projection for tightly holding the bristles.

In testimony whereof I have hereunto affixed my signature.

ARTHUR W. LE BOEUF.